Jan. 10, 1928.
H. A. DICKINSON
1,655,987
IMITATION FIRE
Filed Feb. 10, 1927
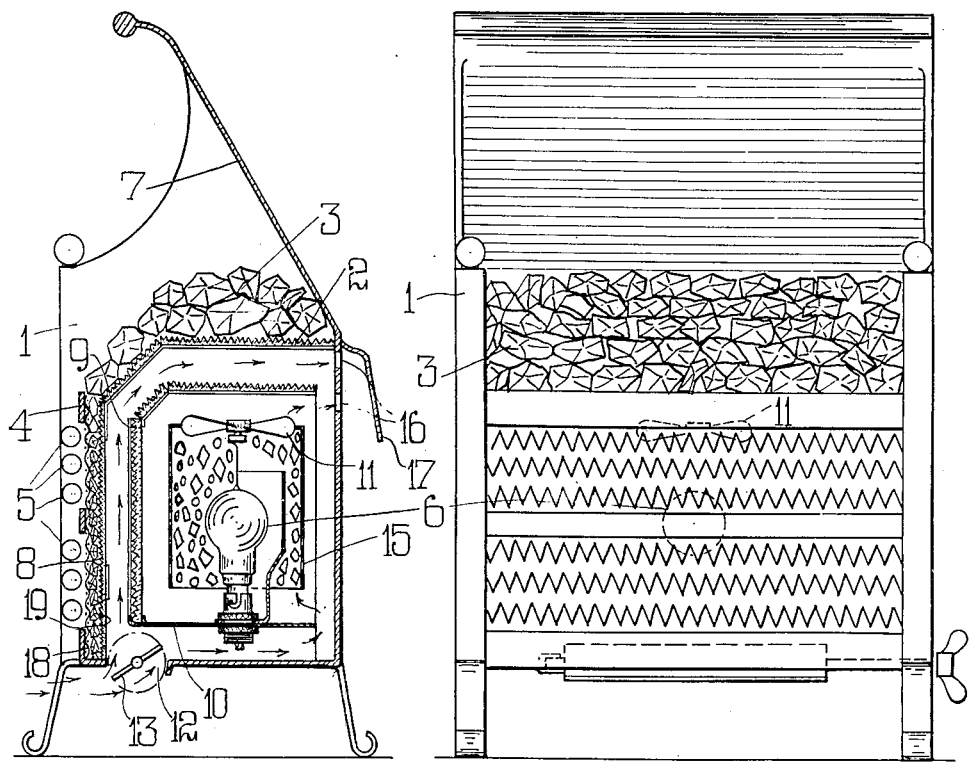
Fig.1.  Fig.2.
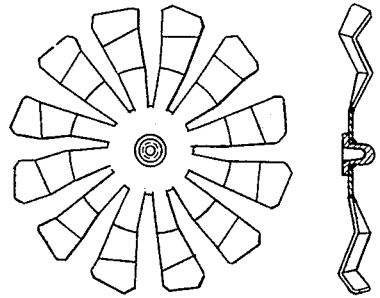  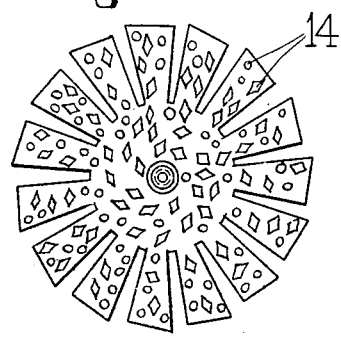
Fig.3.  Fig.4.  Fig.5.

Patented Jan. 10, 1928.

1,655,987

UNITED STATES PATENT OFFICE.

HUBERT ASHLEY DICKINSON, OF MANCHESTER, ENGLAND.

IMITATION FIRE.

Application filed February 10, 1927, Serial No. 167,224, and in Great Britain December 14, 1925.

The present invention relates to improvements in imitation fires usually known as "electric fires", "gas fires", and the like.

Various types of heat radiating devices are in general use in which radiating elements are provided for the radiation of heat energy in combination with devices such as fans rotated by upward currents of heated air from a lamp for producing the semblance of a flickering coal fire.

An object of the present invention is to provide an arrangement in which the flickering will be as irregular as possible to avoid any semblance of mechanical control to the eye of an observer.

In the fires according to the present invention, a sheet of translucent glass having an irregular surface is combined with further means interposed between itself and a source of light to irregularly reflect, refract or obturate the rays from the said source of light.

Such further means may comprise a glass screen having an irregular surface and perforated to allow light to pass directly therethrough without reflection or refraction, or again may comprise a rotating opaque screen perforated with irregularly shaped and disposed holes to allow light to pass directly therethrough without reflection or refraction.

The invention will be more particularly described with reference to the accompanying drawings in which:—

Figure 1 is a side sectional elevation through one form of "fire" according to the present invention.

Figure 2 is a corresponding front view.

Figure 3 is a plan view showing one form of fan.

Figure 4 is a side view corresponding to Figure 3.

Figure 5 is a plan view of a further modification.

A casing 1 is adapted to be closed at the top by means of a sheet of glass 2 preferably having at least one side (in the arrangement shown, the upper side) with an irregular surface. This sheet of glass 2 preferably acts as a supporting surface for pieces of coloured broken glass, glass slag or the like 3.

The front part of the "fire" 4 may be closed, and support the heating elements 5, in which case light from the source of light and heat 6 passes only upwards through the sheets of glass 2 to be reflected by the reflecting back 7 of the casing, or as shown light may also pass through the front of the "fire" by arranging around the electric heating elements 5 broken glass, such as 19 held in position by a wire mesh 18, and at the back of which is arranged a sheet of glass 8 having at least one of its surfaces irregular.

A second series of glass sheets 9 having at least one of their side surfaces irregular is arranged on the casing 10, which may be detachable as a unit from the casing 1, together with a source of light and heat 6. The electric lamp taken by way of example has a source of light and heat which may serve as a means for rotating a fan 11, which may be of the form shown in Figures 3, 4 or 5; that is to say, in which the blades are irregularly bent or shaped, or in which these have perforations such as 14 or both.

An air inlet opening 12 in the base of the casing 1 is controlled by a butter-fly shutter 13, so that not only the volume of air passing in the casing 1 can be controlled but also its direction of flow, so that an effective control is provided for the rotation of the fan 11. This fan 11 may either be of the form shown in Figures 3, 4 or 5, or may be a plain multi-bladed fan, and in which case may support a cylindrical shroud, such as 15 for the light 1, which is itself provided with irregularly shaped or disposed openings.

The air outlets 16 to the casing are protected by a cowl 17, so that back draughts cannot enter the casing.

Additional reflecting means may be provided within the casing as and where desired.

I declare that what I claim is:—

1. An imitation fire comprising in combination a casing, a source of light in said casing, a first sheet of translucent material having an irregular surface, a second sheet of translucent material having an irregular surface spaced from said first sheet, a rotatable opaque screen provided with irregularly shaped and disposed holes interposed between said source of light and said sheets, so that the beams of light through said holes will be variously deflected at the irregular surface of said sheets, broken pieces of colored glass irregularly disposed upon and supported by the outermost of said sheets, and means to rotate said screen so that an illusion of flickering flames is produced by the beams passing through said holes and deflected by said sheets and glass.

2. An imitation fire comprising in combination a casing, a source of light and heat in said casing, a first sheet of translucent material having an irregular surface, a second sheet of translucent material having an irregular surface spaced from said first sheet, a rotatable opaque screen provided with irregularly shaped and disposed holes interposed between said source of light and said sheets so that the beams of light through said holes will be variously deflected at the irregular surface of said sheets, fragments of colored glass irregularly disposed upon and supported by the outermost of said sheets, and means to rotate said screen so that an illusion of flickering flames is produced by the beams passing through said holes and deflected by said sheets and glass, said means including an air flue through said casing and surrounding said source of heat so that an air current is produced thereby, means driven by the air current to move the screen, and a flue regulator on said flue to regulate the passage of air therethrough whereby to control the speed of rotation of said screen.

In witness whereof, I have hereunto signed my name this 25 day of January 1927.

H. A. DICKINSON.